No. 754,939. PATENTED MAR. 15, 1904.
J. G. & M. O. REHFUSS.
APPARATUS FOR SOLDERING CANS.
APPLICATION FILED APR. 3, 1902. RENEWED JAN. 4, 1904.
NO MODEL. 2 SHEETS—SHEET 1.
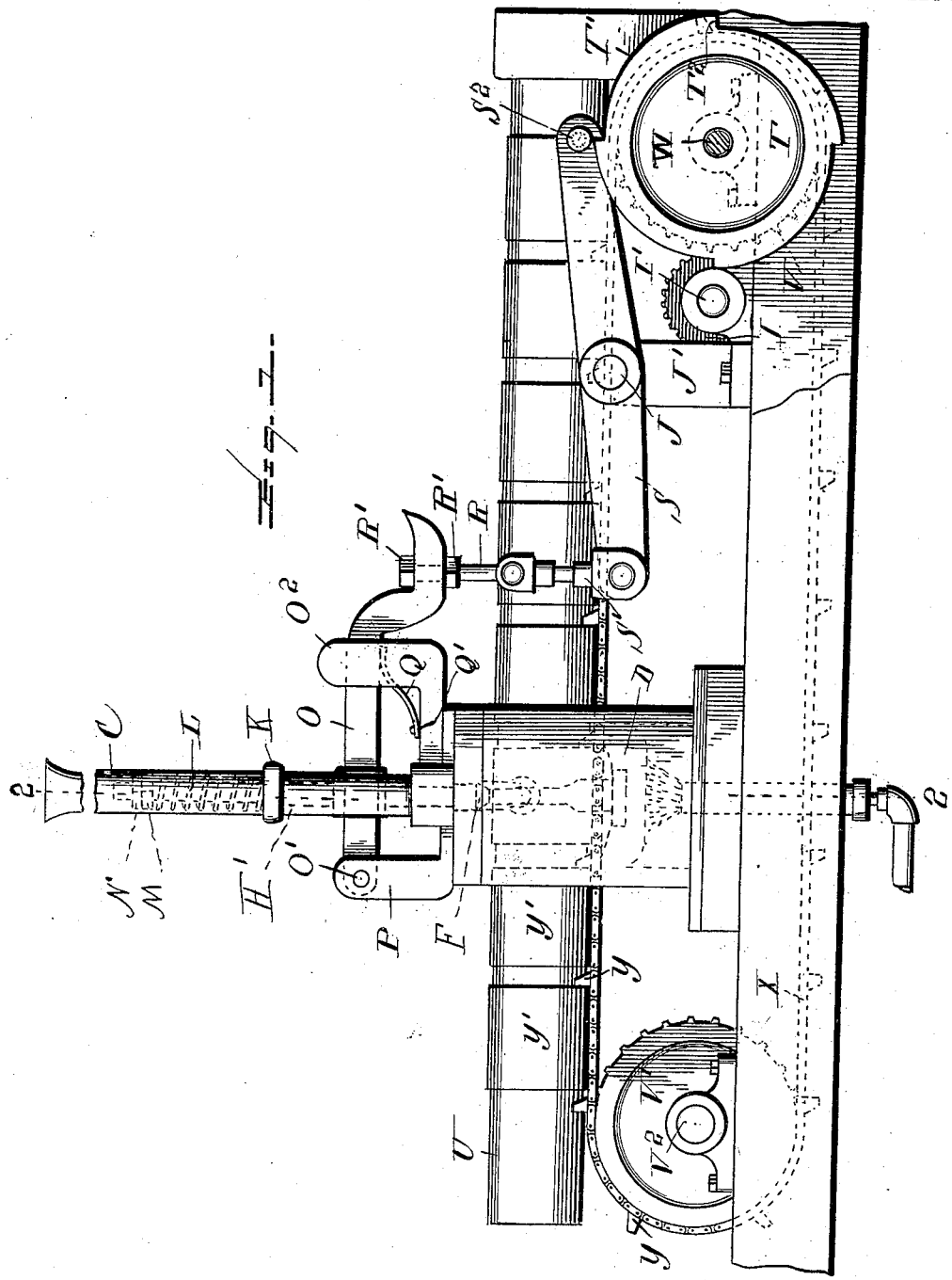

No. 754,939. PATENTED MAR. 15, 1904.
J. G. & M. O. REHFUSS.
APPARATUS FOR SOLDERING CANS.
APPLICATION FILED APR. 3, 1902. RENEWED JAN. 4, 1904.
NO MODEL. 2 SHEETS—SHEET 2.
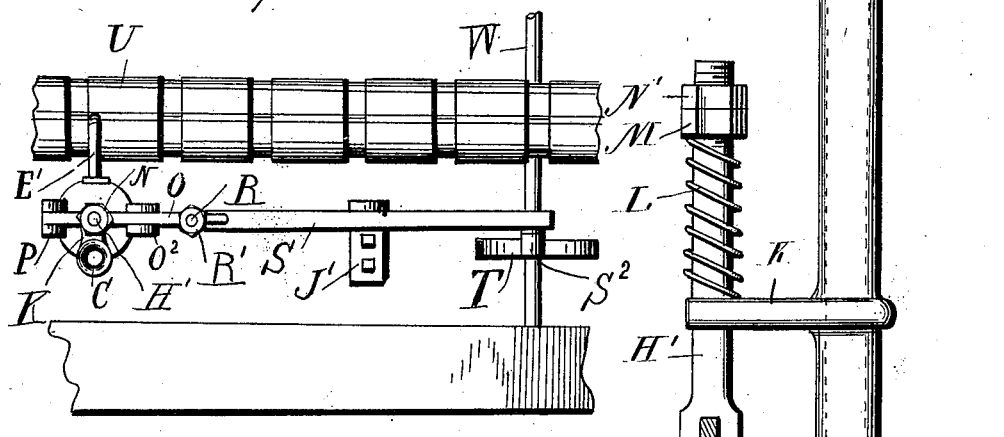
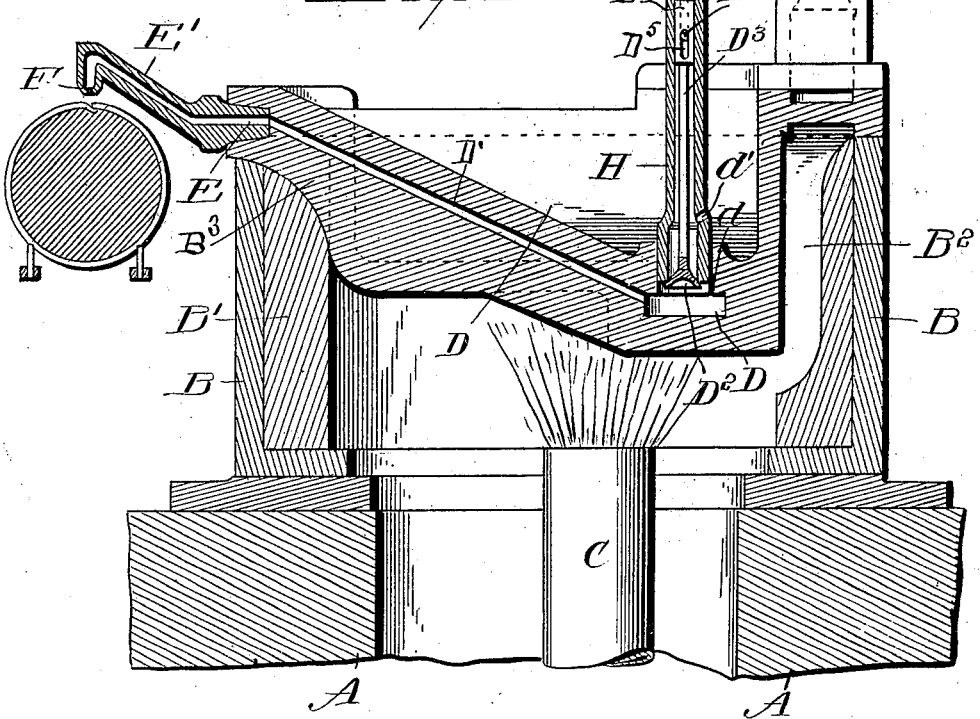
WITNESSES:
W. F. Doyle.
A. L. Hough.
INVENTORS
J. G. Rehfuss AND M. O. Rehfuss,
BY Franklin H. Hough
Attorney No. 754,939.

Patented March 15, 1904.

UNITED STATES PATENT OFFICE.

JOHN G. REHFUSS AND MARTIN O. REHFUSS, OF PHILADELPHIA, PENNSYLVANIA.

APPARATUS FOR SOLDERING CANS.

SPECIFICATION forming part of Letters Patent No. 754,939, dated March 15, 1904.

Application filed April 3, 1902. Renewed January 4, 1904. Serial No. 187,739. (No model.)

*To all whom it may concern:*

Be it known that we, JOHN G. REHFUSS and MARTIN O. REHFUSS, citizens of the United States, residing at Philadelphia, in the county of Philadelphia and State of Pennsylvania, have invented certain new and useful Improvements in Apparatus for Soldering Cans; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for soldering cans; and it consists in the provision of means whereby an intermittent stream of molten solder may be fed against a can in motion, which may be accomplished by any suitable mechanism, and in carrying out our apparatus we have devised a means which is clearly illustrated in the accompanying drawings, which with the letters of reference marked thereon form a part of this application and in which drawings similar letters of reference indicate like parts, and in which drawings—

Figure 1 is a side elevation of our improved apparatus for soldering cans. Fig. 2 is a cross-sectional view taken on line 2 2 of Fig. 1. Fig. 3 is a top plan view showing the relative positions of various parts of the invention.

Reference now being had to the details of the drawings by letter, A designates a frame upon which is supported a casing B, forming a heating-chamber having a suitable lining of fire-brick B', and resting upon the walls of said heating-chamber and fire-brick is a solder-holding vessel B³. An exit passage-way B² for the products of combustion to escape from the heating-chamber leads from the fire-chamber and communicates with a chimney c, rising from one side of said vessel. In the upper surface of the bottom portion of said vessel is a recess or chamber D, from which a duct D' leads to and communicates with the bore E in a solder-feeding nozzle E', which latter is secured in any suitable manner in a recessed portion in the wall of said vessel. The outer end of said solder-feeding nozzle is downwardly disposed and has a feeding-aperture F, which is located adjacent to the seams of cans to be soldered, which cans are fed adjacent to said nozzle by any suitable means.

A hollow pump-piston H, preferably of cylindrical shape, is adapted to fit and work snugly in the cylindrical contracted portion $d$ of the recess D, and $d'$ designates a port leading through the wall of said hollow pump-piston into the space above the bottom of the solder-containing receptacle and through which port a fresh supply of solder is intermittently fed into the recess or chamber D. $D^2$ designates a plunger having a stem $D^3$, carrying a pin $D^4$, having a play in a slot $D^5$ in a block $D^6$, carried by the hollow piston H. An adjusting-screw $D^7$, mounted in said block, is utilized to limit the longitudinal movement of said stem $D^3$ and plunger, thus regulating the supply of solder being fed into the recess D as the piston rises.

Extending laterally from the chimney at any suitable location is a bracket-arm K, which is apertured adjacent to its outer end to receive the upper solid portion of the vertically-reciprocating pump-piston H, which pump-piston is held at its farthest upward throw by means of a coil-spring L, one end of which spring bears against the upper edge of said bracket-arm, and its other end bears against a nut M, which is held in an adjusted position by means of a jam-nut N', mounted on the upper threaded end of said piston. Said piston is apertured at any suitable location to receive an oscillating lever O, which is pivoted at one end on a pin O', carried by a bracket-arm P, rising from the solder-containing vessel. A second spring Q is provided, which is fastened, as at Q', to a bracket $O^2$ on the solder-containing vessel, and its other end bears against the under edge of said lever O and serves to hold said lever at its highest upward throw, which lever is guided in its movements in an elongated slot in said bracket $O^2$. The outer end of said lever portion is apertured to receive the end of a bolt R, which passes through said aperture, and being held to said lever by means of the nuts R', which are mounted on the threaded end of the bolt on opposite edges of said lever, the latter may be adjustably held on said bolt. The bolt R is connected to the rocking lever S by means of the pivoted link S'. Said rocking lever is pivotally mounted on a pin J, carried at the upper ends of the standards J', mounted on the frame of the apparatus.

T designates a wheel having a periphery made up of four segment cam-surfaces T', which terminate abruptly in offsets $T^2$ between each cam-surface, and said wheel is mounted on a shaft W, carrying a gear-wheel V, (not shown,) also keyed to said shaft and in mesh with a gear-wheel I, which is mounted upon and driven by an operating-shaft I'.

V' designates a gear or sprocket wheel which is similar in construction to the wheel V and is mounted upon a shaft $V^2$, journaled in suitable bearings on the frame of the machine, and X designates an endless chain which travels about said wheels V and V'. At suitable intervals on said chain are lugs $y$, which serve as means for carrying the cans $y'$ forward during the soldering process and upon the former U, about which the cylindrical body portions of the cans have been formed with their edges interlocked prior to their being soldered, said body portions being successively fed forward underneath the nozzle, where the soldering is effected.

Mounted at the free end of said lever S is an antifriction-roller $S^2$, which is adapted to travel about the circumference of the wheel T, made up of segment cam-surfaces, and when said roller comes to an offset portion $T^2$ the springs before referred to will cause the outer free end of the rocking lever carrying the antifriction-wheel $S^2$ to tilt down and the piston in the solder-pump to quickly rise, and the molten solder which has previously passed through the duct $d'$ into the lower end of the hollow pump-piston will pass through the space between the plunger $D^2$ and the inner wall of the hollow piston into the recess or chamber D, from which it is forced in the next downward throw of the piston and plunger through the duct D' to the solder-feeding nozzle E'.

The operation of the apparatus illustrated is as follows: The cans, which are fed by any suitable mechanism on the former U, pass successively underneath the nozzle, and during the time that the can passes underneath the nozzle the antifriction-wheel at the end of the rocking lever S is traveling up a segment cam-surface T', and the parts of the mechanism are so adjusted and timed that when the rear end of a can passes the nozzle said antifriction-wheel arrives at an offset $T^2$ and drops down on the adjacent segment cam-surface, which movement will cause the solder-feeding to cease until the adjacent can to be soldered arrives at a location with its forward end underneath the solder-feeding nozzle, at which moment the feeding of the molten solder is begun and continued, while the body portion of the can passes its length underneath the nozzle. The feeding of the solder is caused by the downward throw of the plunger and hollow piston, thus forcing the solder through the duct and over the seam of the can.

Having thus fully described our invention, what we claim as new, and desire to secure by Letters Patent, is—

1. A soldering apparatus comprising a solder-holding receptacle with a recess therein, a hollow piston working in the latter, a plunger mounted within said piston and having a movement independent thereof, a nozzle projecting from the receptacle and communicating through a duct with said recess, as set forth.

2. A soldering apparatus comprising a solder-holding receptacle with a recess therein, a hollow piston with an apertured wall and plunger, a nozzle, a duct communicating between the same and said recess, means for feeding a supply of molten solder into said recess on the upward throw of the piston and a plunger for forcing the solder from said recess to and through the nozzle, on the downward throw of said piston and plunger, as set forth.

3. A soldering apparatus comprising a solder-holding receptacle, a hollow piston working in a recess in said receptacle, a plunger carried by said piston, a nozzle, a duct communicating between the same and said recess, and means for alternately feeding a supply of molten solder from the receptacle into said recess, and forcing the solder by said plunger and piston from the recess through the duct and nozzle, as set forth.

4. A soldering apparatus comprising a solder-containing receptacle having a chambered portion, a nozzle communicating with said chambered portion, a hollow piston snugly fitting the walls of said chambered portion, and an adjustable plunger mounted within said piston, as set forth.

5. A soldering apparatus comprising a solder-receptacle having a chambered portion in the bottom thereof, a nozzle communicating with said chambered portion, a hollow piston adapted to reciprocate in said chambered portion and snugly fit against the walls thereof and provided with an apertured wall, and a plunger working in said piston below the aperture in the wall thereof, as set forth.

6. A soldering mechanism comprising a solder-receptacle having a chambered portion in the bottom thereof, a nozzle, a duct communicating between the nozzle and said chambered portion, a hollow piston working in said chambered portion, a plunger adjustably mounted within the hollow piston, and means for actuating the same, whereby solder is allowed to enter said chambered portion as the piston is raised, as set forth.

7. A soldering apparatus comprising a solder-containing receptacle, a nozzle and duct leading from a recess in said pot and communicating with the nozzle, a hollow pump-piston working in said recess, and a plunger mounted within said piston, and means for operating said piston and plunger, whereby molten solder is forced through the duct and nozzle against a can to be soldered, as set forth.

8. A soldering apparatus comprising a containing-receptacle, a hollow apertured piston working in a recess in the pot, a nozzle, and a duct communicating between the same and said recess, a plunger adjustably held within said piston, and means for operating said piston and plunger, as set forth.

9. A soldering apparatus comprising a solder-containing receptacle, a hollow piston with apertured wall, working in a recess in said receptacle, a nozzle, a duct communicating between the same and said recess, a plunger having a flaring end and adjustably held within the hollow piston, and means for operating said piston and plunger, whereby an intermittent stream of solder is forced from the receptacle to and through the nozzle, and against the can to be soldered, as set forth.

10. A can-soldering apparatus comprising a receptacle, a reciprocating hollow piston with an apertured wall, working in a recess in said receptacle, a plunger having a flaring end adapted to be held so as to allow more or less solder to pass between its flaring end and the end of the hollow piston as the latter is raised, a nozzle, a duct communicating between the same and said recess, and a lever adapted to reciprocate said piston and plunger, as set forth.

11. A soldering apparatus comprising a solder-holding receptacle, a hollow piston having an apertured wall, working in a recess in said receptacle, a plunger having a flaring end, and a stem mounted within the hollow piston, and means for adjusting said stem, whereby the plunger may be held at different locations with reference to the hollow end of the piston, a nozzle, a duct communicating between same and said recess, an oscillating lever, and means for imparting a variable reciprocating movement to said piston and plunger, as set forth.

12. A soldering apparatus comprising a receptacle, a spring-actuated hollow piston with apertured wall, which works snugly in a recess in said receptacle, a plunger mounted in said piston, a nozzle, a duct communicating between the same and said recess, and an oscillating lever connected to said piston and adapted to impart a variable motion to said piston and plunger, as set forth.

13. A soldering apparatus comprising a solder-containing receptacle, a hollow piston with apertured wall, adapted to work in a recess in said receptacle, a plunger adjustably held within said piston, a nozzle, a duct communicating between said nozzle and recess, a pivotal lever connected to the shank portion of said piston, a rotary wheel having segment cam-surfaces about its circumference, and an oscillating arm actuated by said wheel connected to one end of said lever, whereby a variable motion is imparted to said piston and plunger, as set forth.

14. A soldering apparatus comprising a receptacle, a hollow piston with apertured wall, working in a recess in said receptacle, a plunger mounted within said receptacle, a nozzle, a duct communicating between the same and said recess, a lever pivoted at one end and connected to the shank portion of said piston, a spring fixed at one end and adapted to hold said lever at its highest limit, and means for imparting a variable movement to said lever, as set forth.

15. A soldering apparatus comprising a receptacle, a hollow piston with apertured wall, mounted to work in a recess in said receptacle, a plunger adjustably held within said piston, a nozzle, a duct communicating between the same and said recess, a lever pivoted at one end and connected to the shank portion of said piston, a spring adapted to hold said lever at its highest throw, a rocking arm or lever having pivotal connection with said pivoted lever, a rotatable wheel having a series of cam-surfaces about its circumference, and an antifriction-wheel pivotally mounted on said rocking arm and adapted to ride upon the circumference of said wheel, and means for imparting a variable movement to said piston, as set forth.

16. An apparatus for soldering cans comprising a solder-receptacle, a spring-actuated hollow piston with apertured wall, working in a recessed portion of said receptacle, a plunger adjustably held within said piston and adapted to work in said recess, a nozzle, a duct communicating between the same and said recess, a pivotal lever connected to the shank portion of said piston, a spring bearing said lever, a rocking lever connected to said pivotal lever, a rotatable wheel having a series of cam-surfaces terminating abruptly in shoulders about its circumference, and an antifriction-wheel mounted upon the rocking lever and adapted to travel about the circumference of said wheel, whereby a variable motion is imparted to the piston and plunger, as set forth.

17. A soldering apparatus comprising a receptacle, a hollow piston with apertured wall working in a recess in said receptacle, a plunger adjustably mounted within said piston, a nozzle, a duct communicating between said nozzle and recess, a pivotal spring-actuated lever passing through the shank portion of said piston, a rocking lever, a wheel having a series of segment-cams terminating abruptly about the circumference of said wall, an antifriction-wheel carried by said rocking lever and adapted to ride upon the circumference of said wheel, and connections between said levers, as set forth.

18. A soldering apparatus comprising a solder-receptacle, a reciprocating hollow spring-actuated piston with apertured wall, working in a recess in said receptacle, a plunger adjustably mounted within the piston, a nozzle, a duct communicating between the same and said recess, a pivotal lever passing through an aperture in the solid shank of said piston, a spring held yieldingly against the under edge of said lever, a rocking lever having adjustable connections between the same and said pivotal lever, a wheel having a series of cam-surfaces about its circumference terminating in abrupt shoulders, and an antifriction-wheel carried by said rocking lever and adapted to travel upon said cam-surfaces, as set forth.

19. A soldering apparatus comprising a solder-holding receptacle, a heating-chamber underneath the same, a chimney and flue leading from said heating-chamber to said chimney, a bracket-arm carried by the chimney, a piston guided in an aperture in said arm, the lower end of said piston being hollow and provided with an aperture, said piston adapted to work in a recess in said receptacle, a plunger adjustably held within the piston, a nozzle, a duct communicating between the same and said recess, a pivotal lever passing through the shank portion of said piston, a spring held yieldingly against the under edge of the pivotal lever, a rocking lever and adjustable connections between same and said pivotal lever, a wheel having a series of cam-segments about its circumference, and an antifriction-wheel carried by the rocking lever and adapted to travel upon said cam-surfaces, as set forth.

20. A soldering apparatus comprising a receptacle, a hollow piston with apertured wall, working in a recess in said receptacle, a nozzle, a duct communicating between said nozzle and recess, a plunger having a flaring end adjacent to the open end of said piston, a stem in said plunger mounted within said piston, and an adjusting-screw adapted to bear against the end of said stem to regulate the distance of space between said plunger and the open end of the piston, and means for imparting a variable reciprocating movement to said piston and plunger, as set forth.

In testimony whereof we affix our signatures in presence of two witnesses.

JOHN G. REHFUSS.
MARTIN O. REHFUSS.

Witnesses:
   Jos. Ziegler,
   J. B. Jardella.